United States Patent
McBrien et al.

(10) Patent No.: US 10,006,371 B2
(45) Date of Patent: Jun. 26, 2018

(54) FILM HOLE WITH IN-WALL ACCUMULATOR

(71) Applicant: United Technologies Corporation, Hartford, CT (US)

(72) Inventors: John McBrien, South Glastonbury, CT (US); Thomas N. Slavens, Vernon, CT (US); Clifford J. Musto, West Hartford, CT (US); Timothy J. Jennings, South Windsor, CT (US); Nicholas M. LoRicco, Coventry, CT (US); Sasha M. Moore, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 497 days.

(21) Appl. No.: 14/827,050

(22) Filed: Aug. 14, 2015

(65) Prior Publication Data
US 2016/0076451 A1 Mar. 17, 2016

Related U.S. Application Data

(60) Provisional application No. 62/050,324, filed on Sep. 15, 2014.

(51) Int. Cl.
*F02C 7/18* (2006.01)
*F01D 5/18* (2006.01)
(Continued)

(52) U.S. Cl.
CPC .............. *F02C 7/18* (2013.01); *F01D 5/186* (2013.01); *F01D 9/023* (2013.01); *F01D 9/065* (2013.01);
(Continued)

(58) Field of Classification Search
CPC ...... F02C 7/18; F02C 3/04; F01D 5/18; F01D 5/186; F01D 5/187; F01D 5/188;
(Continued)

(56) References Cited

U.S. PATENT DOCUMENTS 4,992,025 A * 2/1991 Stroud ................. B23K 26/388
415/115
2010/0008759 A1 1/2010 Johns et al.
(Continued)

FOREIGN PATENT DOCUMENTS

EP 2568118 3/2013
EP 2584147 4/2013

OTHER PUBLICATIONS

Extended European Search Report dated Jan. 14, 2016 in European Application No. 15184783.7.

*Primary Examiner* — Phutthiwat Wongwian
*Assistant Examiner* — Loren Edwards
(74) *Attorney, Agent, or Firm* — Snell & Wilmer, L.L.P.

(57) ABSTRACT

A gas turbine engine component is described. The component includes a component wall having an internal surface that is adjacent a flow of coolant and an external surface that is adjacent a flow of gas. The component wall includes a cooling hole that has an inlet defined by the internal surface and an outlet defined by the external surface. The cooling holes also has a metering location having the smallest cross-section area of the cooling hole, an internal diffuser positioned between the inlet and the metering location, an accumulation diverter portion of the internal diffuser and an accumulator portion of the internal diffuser.

19 Claims, 6 Drawing Sheets

(51) Int. Cl.
   *F01D 9/06* (2006.01)
   *F01D 9/02* (2006.01)
   *F02C 3/04* (2006.01)
   *F23R 3/00* (2006.01)

(52) U.S. Cl.
   CPC ............... *F02C 3/04* (2013.01); *F23R 3/002* (2013.01); *F23R 3/005* (2013.01); *F05D 2220/32* (2013.01); *F05D 2240/81* (2013.01); *F05D 2260/202* (2013.01); *F23R 2900/03042* (2013.01); *Y02T 50/672* (2013.01); *Y02T 50/673* (2013.01); *Y02T 50/676* (2013.01)

(58) Field of Classification Search
   CPC .......... F01D 5/189; F01D 9/023; F01D 9/065; F01D 25/12; F23R 3/002; F23R 3/005; F23R 2900/03042; F05D 2220/32; F05D 2240/81; F05D 2260/202; Y02T 50/672; Y02T 50/673; Y02T 50/676
   USPC .......................................................... 60/806
   See application file for complete search history.

(56) References Cited

U.S. PATENT DOCUMENTS

| | | | |
|---|---|---|---|
| 2013/0209229 A1* | 8/2013 | Xu | ............... F01D 5/186 415/115 |
| 2014/0219814 A1* | 8/2014 | Heselhaus | ............... F01D 5/186 416/96 R |

* cited by examiner

FILM HOLE WITH IN-WALL ACCUMULATOR

CROSS-REFERENCE TO RELATED APPLICATIONS

This application is a nonprovisional of, and claims priority to, and the benefit of U.S. Provisional Application No. 62/050,324, entitled "FILM HOLE WITH IN-WALL ACCUMULATOR," filed on Sep. 15, 2014, which is hereby incorporated by reference in its entirety.

FIELD

The present disclosure relates generally to a gas turbine engine and more specifically to turbine blades and/or vanes exposed to high temperature.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and an electric generator to generate electrical power. The compressor can also include multiple rows or stages of stator vanes and rotor blades that compress coolant. The efficiency of the engine can be increased by passing a higher temperature gas flow through the turbine or by increasing the pressure ratio provided by the compressor.

However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow.

Also, the pressure ratio is limited to the airfoil material properties and the cooling capabilities of these airfoils in the compressor. The increase in pressure and proximity to the combustor in later compressor stages causes the temperature within the combustor, and in particular on the airfoil surfaces, to increase.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A gas turbine engine component is described. The component includes a component wall having an internal surface that is adjacent a flow of coolant and an external surface that is adjacent a flow of gas. The component wall includes a cooling hole that has an inlet defined by the internal surface and an outlet defined by the external surface. The cooling holes also has a metering location having the smallest cross-section area of the cooling hole, an internal diffuser positioned between the inlet and the metering location, an accumulation diverter portion of the internal diffuser and an accumulator portion of the internal diffuser.

Also described is a gas turbine engine. The gas turbine engine has a compressor section, a combustor section and a turbine section. At least one of the compressor section or the turbine section include a component that includes a component wall. The component wall has an internal surface adjacent a flow of coolant and an external surface adjacent a flow of gas. The component wall includes a cooling hole having an inlet defined by the internal surface, an outlet defined by the external surface and a metering location having the smallest cross-section area of the cooling hole. The cooling hole also has an internal diffuser positioned between the inlet and the metering location, an accumulation diverter portion of the internal diffuser and an accumulator portion of the internal diffuser.

Also described is a gas turbine engine component wall that includes an external surface, an internal surface and a cooling hole. The cooling hole has a metering location and a lower wall extending from the internal surface to the external surface. The lower wall has a first lower wall portion that extends from the metering location to the external surface and a second lower wall portion that extends from the internal surface to the metering location. The second lower wall portion includes a curve adjacent the internal surface that curves towards the metering location. The cooling hole also includes a diverter wall that has a first side adjacent the internal surface and a second side. The diverter wall forms an angle with the internal surface. The cooling hole also includes an upper wall that extends from the internal surface to the external surface. The upper wall has a first upper wall portion that extends from the metering location to the external surface and a second upper wall portion that extends from the second side of the diverter wall to the metering location. An in wall diffusion angle exists between the first upper wall portion and the second upper wall portion. The in wall diffusion angle is between 150 degrees and 170 degrees.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
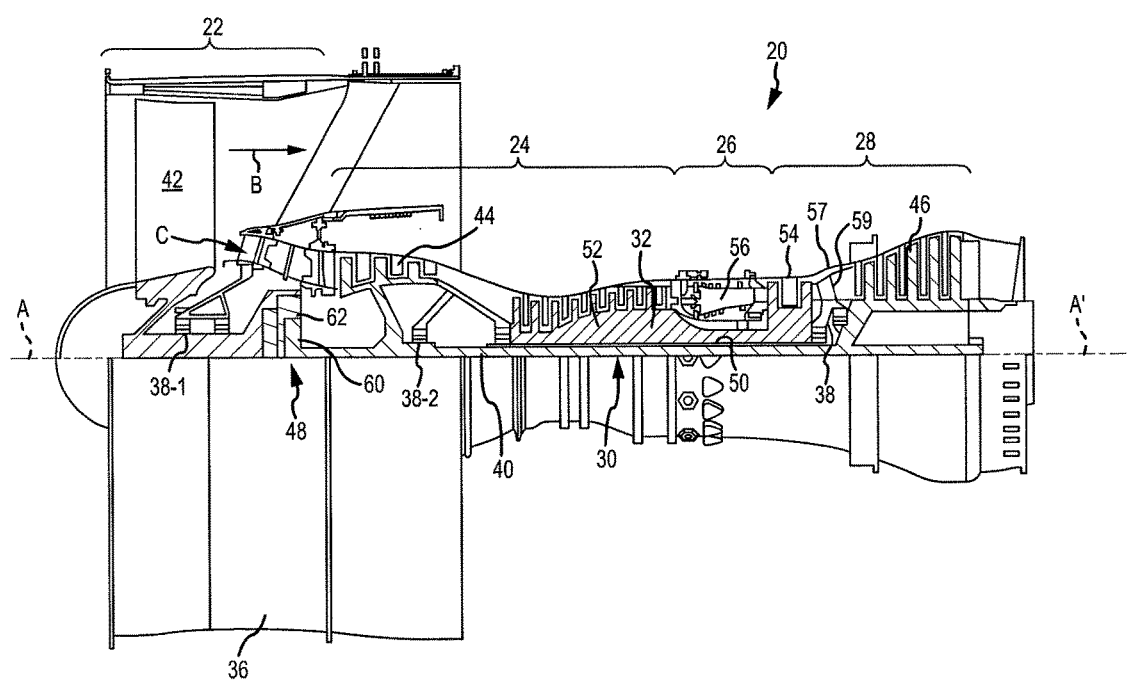
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency which requires higher pressure ratios and higher temperatures in high pressure compressor 52. These higher operating temperatures and pressure ratios may create operating environments that may cause thermal loads that are higher than the thermal loads which may shorten the endurance life of current components.

Figure 2:
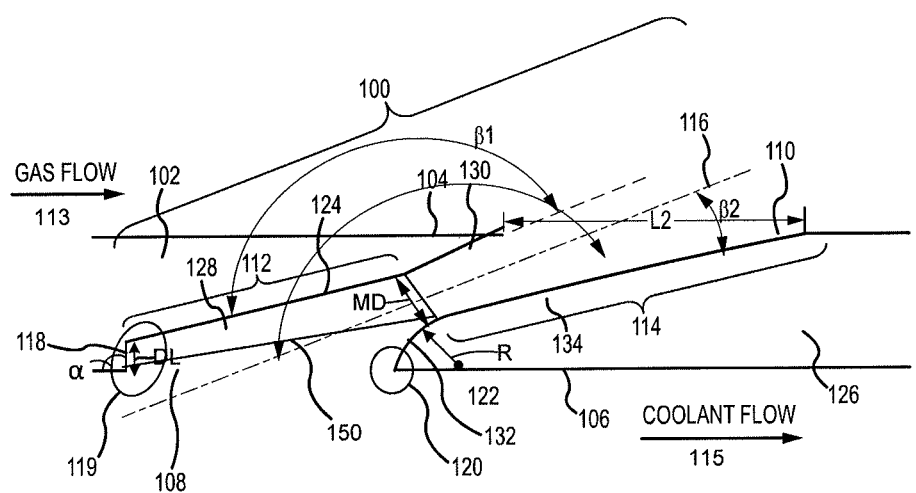
FIG. 2 illustrates a cooling hole 100 positioned in a component of gas turbine engine in accordance with various embodiments.

FIG. 2 illustrates a cooling hole 100 positioned in a component of gas turbine engine 20. The component may have a component wall 102 that has a gas flow side (external surface 104) and a coolant flow side (internal surface 106). The cooling hole 100 includes an inlet 108 on the internal surface 106 and an outlet 110 on the external surface 104. Cooling hole 100 has an internal diffuser 112 and an external diffuser 114. In between internal diffuser 112 and external diffuser 114 is a metering location 122.

Typically, coolant flows along the internal surface 106 and enters cooling hole 100 via inlet 108. The coolant then travels through cooling hole 100, through metering location 122, and exits cooling hole 100 via the outlet 110. Between inlet 108 and metering location 122, the coolant is accumulated and converged via the internal diffuser 112. This accumulative convergence conditions the coolant flow by directing the coolant towards metering location 122 such that the coolant is substantially parallel to a major diffusing axis 116 of external diffuser 114. After metering location 122, the coolant diffuses outward towards outlet 110 via the external diffuser 114.

Typically, internal diffuser 112 has a volume that is equal to or larger than a volume in the external diffuser 114. This configuration minimizes flow separation that typically can occur within the external diffuser of cooling hole 114.

Within internal diffuser 112 is an accumulation diverter 119 positioned on a far side of cooling hole 100. Accumulation diverter 119 includes a diverter wall 118. Accumulation diverter 119 helps to create a pocket 111 (illustrated in FIG. 4B) of lower velocity coolant. Pocket 111 is formed by the shape of accumulation diverter 119. Pocket 111 of lower velocity coolant can then be used to condition the coolant flow through cooling hole 100 (in particular through metering location 122), improving fluid attachment to the cooling hole and thereby improving hole film performance.

Diverter wall 118 further assists in controlling the coolant, resulting in total pressure being driven through cooling hole 100. Diverter wall 118 may be straight or it may be curved. Diverter wall 118 generally has a length DL that is at least ⅓ of the diameter of the metering location 122 MD. The diameter MD is an indicator of the cross-sectional area of cooling hole 100 at the metering location 122. Because the pocket causes a localized decrease in velocity within a volume having a free-ejection normal coincident with that of film hole metering location 122, the driving pressure for flow through the meter is higher than that relative to the coolant free stream. In situations where the coolant flow direction has a velocity component substantially normal to the surface normal of accumulator wall 118, a total pressure recovery is commensurate with a stagnation for inducing ram force that works in concert with static pressure of coolant, resulting in increased driving pressure through cooling hole 100.

An angle α exists between internal surface 106 and diverter wall 118. In various embodiments, angle α is at or near 90°. Having diverter wall 118 positioned at angle α assists accumulation diverter 119 in creating the pocket of low pressure within accumulation diverter 119. Accumulation diverter 119 allows higher pressure to build up in line with metering location 122. In other words, accumulation diverter 119 locally slows down the feed flow of the cooling hole, converting velocity to static driver pressure.

Cooling hole 100 includes an upper wall 124 and a lower wall 126. Internal diffuser 112 is defined by an internal diffuser upper wall 128 and an inner diffuser lower wall 132. Internal diffuser upper wall 128 extends from a side of diverter wall 118 opposite internal surface 106 to the point along upper wall 124 where upper wall 124 intersects metering location 122. Inner diffuser lower wall extends from the point where lower wall 126 intersects internal surface 106 to the point where lower wall 126 intersects metering location 122.

External diffuser 114 is defined by an external diffuser upper wall 130 and an external diffuser lower wall 134. External diffuser upper wall 130 extends from the point where upper wall 124 intersects metering location 122 to the point where upper wall 124 intersects external surface 104. External diffuser upper wall 130 is parallel to major diffusing axis 116. External diffuser lower wall 134 extends from the point where lower wall 126 intersects metering location 122 to the point where lower wall 126 intersects external surface 104.

In various embodiments, the volume of internal diffuser 112 may be larger than the volume of external diffuser 114. In various embodiments, the ratio of internal diffuser volume to external diffuser volume may be 1:1. In various embodiments, the ratio of internal diffuser volume to external diffuser volume may be 2.5:1.

An in wall diffusion angle β1 exists between internal diffuser upper wall 128 and external diffuser upper wall 130. Angle β1 is generally less than 180°, indicating that internal diffuser 112 is present in cooling hole 100. In various embodiments, angle β1 is less than 180°. In various embodiments, angle β1 is between 150° and 170°.

In various embodiments, component wall 102 and cooling hole 100 are formed by additive manufacturing by forming layers of material upon each other. The material may be, for example stainless steel, an austenitic nickel-chromium-based alloy such as Inconel® which is available from Special Metals Corporation of New Hartford, N.Y., USA, titanium, composite materials, and other suitable materials.

Internal diffuser 112 includes an accumulator 120 positioned on a near side of cooling hole 100. Accumulator 120 may not have sharp angles nor a sharp radial or vertical wall. Accumulator 120 may have a curved shape such that it is aerodynamically contoured so that coolant flows around it towards metering location 122.

The curved shape of accumulator 120 may have a radius R. Radius R of accumulator 120 may be close to the radius of cooling hole 100 at the metering location MD. This creates a tangency within all points in the interior walls of cooling hole 100. Also, the radius of accumulator 120 allows the accumulator 120 to be formed without sharp edges or straight walls.

Metering location 122 is the location of the cooling hole 100 having the smallest diameter or cross-section area. (Any other indicator of cross-section area, including cross-section area, may be utilized instead of diameter). Across metering location 122, cooling hole 100 may have a round shape. Metering diameter MD is selected based on desired flow control through cooling hole 100 and heat load on component wall 102.

Outlet 110 has a distance L2 which may comprise the width of cooling hole 100 at outlet 110. In various embodiments, a ratio of distance L2 to metering diameter MD may be less than eight (8).

Accumulator 120 has a distance 150 between accumulation diverter 119 and metering location 122. A ratio of distance 150 to metering diameter MD may be at least 2-to-1.

Figure 3A:
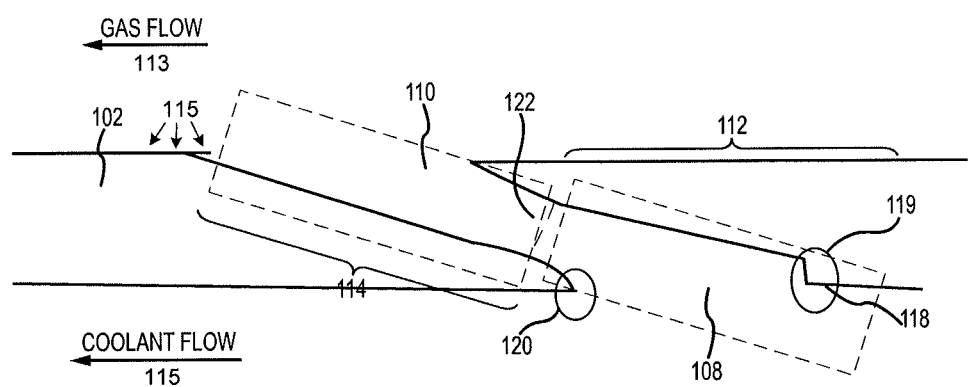
FIG. 3A illustrates a cooling hole within a component wall in accordance with various embodiments.

FIG. 3A illustrates cooling hole 100 within component wall 102. In the embodiment illustrated in FIG. 3A, the direction of gas flow is indicated by arrow 113 and the direction of coolant flow is indicated by arrow 115. When coolant passes inlet 108, some of the coolant enters cooling hole 100 via inlet 108. The coolant then travels through cooling hole 100 at a given velocity.

Because of the shape of accumulator 120 and accumulation diverter 119, a portion of the coolant retains its velocity through cooling hole 100. The coolant travels through internal diffuser 112, where it is directed towards metering location 122, until it reaches metering location 122.

As mentioned above, pocket 111 of coolant forms in accumulation diverter 119. Because of the shape of accumulation diverter 119, the coolant does not change direction or speed while traveling through internal diffuser 112. Because the coolant does not change direction or speed, the coolant retains its velocity through internal diffuser 112

Accumulator 120 helps to turn air towards metering location 122. Because of the shape of internal diffuser 112, accumulator 120 and accumulation diverter 119, total pressure is applied through cooling hole 100 instead of simply static pressure. Ram force from coolant is applied through cooling hole 100 and provides extra pressure, resulting in total pressure, instead of static pressure alone.

To summarize the above, when coolant enters internal diffuser 112, the shape of accumulator 120, diverter wall 118 and accumulation diverter 119 help to lower the angle between the flow direction and the direction of inlet 108. This tends to reduce velocity and pressure losses through internal diffuser 112. The reduction in velocity and pressure losses through internal diffuser allows for a greater mass of coolant to be distributed per unit time over a surface 115 of component wall 102.

After coolant exits metering location 122, it becomes scattered through external diffuser 114. Coolant then enters the gas flow on the gas flow side of component wall 102. Because coolant is scattered via external diffuser 114, coolant is able to more effectively cover surface 115 of component wall 102. This more effective coverage provides more effective cooling capabilities through cooling hole 100.

Figure 3B:
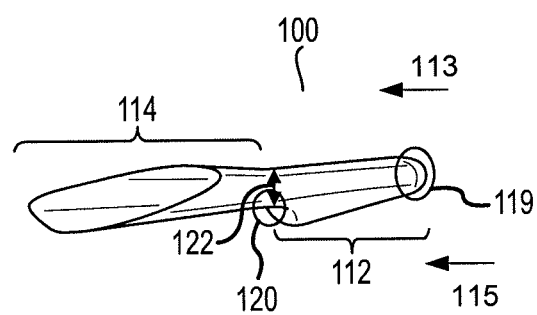
FIG. 3B illustrates a 3-D view of a cooling hole in accordance with various embodiments.

FIG. 3B illustrates a 3-D view of cooling hole 100. As illustrated, internal diffuser 112 is on the right, external diffuser 114 is on the left, and metering location 122 is in the center of cooling hole 100. Metering location 122 may be in the middle of cooling hole 100 or it may be positioned further towards the coolant flow side of component wall 102, or may be positioned further towards gas flow side of component wall 102.

In various embodiments, accumulation diverter 119 may be rounded at inlet 108. In various embodiments, accumulation diverter 119 may not be rounded and may instead have sharp edges and angles. In various embodiments, accumulator 120 may be rounded, as illustrated in FIG. 3B. In various embodiments, accumulator 120 may have edges and angles.

Figure 4A:
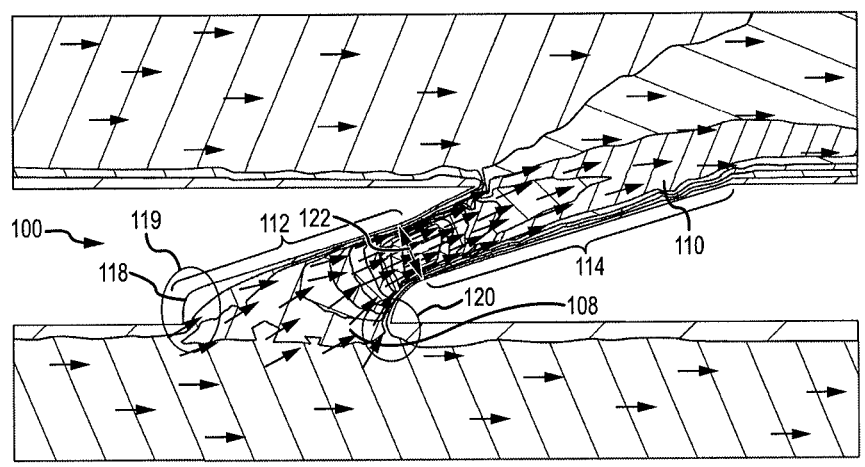
FIG. 4A illustrates a velocity contour of a cooling hole in accordance with various embodiments.

FIG. 4A illustrates a velocity contour of cooling hole 100. In FIG. 4A, coolant is flowing in the direction indicated by arrow 115 and gas is flowing in the direction indicated by arrow 113. Coolant enters inlet 108 of cooling hole 100. As illustrated, velocity of coolant increases as soon as coolant enters inlet 108. Velocity of coolant increases slightly throughout internal diffuser 112 until coolant nears metering location 122. This velocity increase is due to accumulation diverter 119 and accumulator 120.

Immediately before coolant reaches metering location 122, the velocity of coolant greatly increases. As coolant enters external diffuser 114, velocity of coolant begins to decelerate. However, velocity of coolant remains at a higher level than coolant flow even as coolant exits outlet 110. Velocity of coolant then remains higher as it enters gas path.

As illustrated, velocity is higher through external diffuser 114 than through internal diffuser 112, particularly at outlet 110 versus inlet 108. Because of the design of accumulator 120 and accumulation diverter 119, the coolant is traveling in a direction toward metering location 122. Internal diffuser 112 also diffuses the coolant so that errant coolant is flowing towards metering location 122. If coolant was not traveling toward metering location 122, then coolant would be forming less pressure at metering location 122, as ram force would not be a factor. However, because the coolant is traveling in the correct direction (towards metering location 122), ram pressure will be added to the static pressure through cooling hole 100.

Figure 4B:
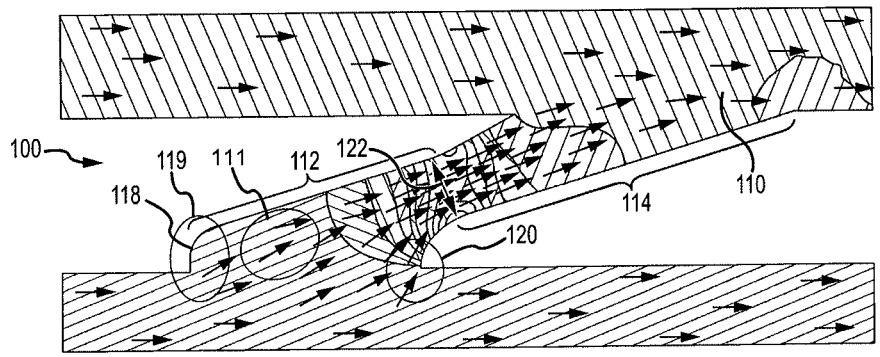
FIG. 4B illustrates a pressure contour of a cooling hole in accordance with various embodiments.

FIG. 4B illustrates a pressure contour of cooling hole 100. As illustrated, accumulation diverter 119 is nearly at the same pressure as coolant flow. This aids in generating greater pressure deeper into cooling hole 100 (near metering location 122). By having pressure at accumulation diverter 119 be similar to pressure of coolant flow at cooling hole 100, coolant flows around this plenum in a direction towards metering location 122. This results in cooling hole 100 being fed with total pressure (static plus ram) instead of only static pressure.

As illustrated, pressure greatly increases as the coolant approaches metering location 122. Part of this pressure is ram pressure from velocity of the coolant. The pressure near metering location 122 is greater than it would be without internal diffuser 112, accumulation diverter 119 and accumulator 120. The increase in pressure allows more volume of coolant travel through cooling hole 100, resulting in more effective cooling of component wall 102.

Accumulation diverter 119 provides for control of coolant in cooling hole 100. By controlling coolant flow, we can direct coolant in a preferred direction, toward metering location 122. Accumulator 120 also provides for extra accumulation of coolant into inlet 108 and proper turning of coolant towards metering location 122. The shape of internal diffuser 112 allows velocity of the coolant to increase in pressure as coolant travels toward metering location 122.

By combining accumulation diverter 119, accumulator 120 and internal diffuser 112, velocity and pressure of coolant through cooling hole 100 is increased. Again, this provides larger volume of coolant through cooling hole 100, which in turn better fills the external diffuser 114 with coolant. A more pressurized (higher mass of coolant) external diffuser 114 results in a higher mass of coolant per unit time to flow along component wall 102.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine component comprising:
a component wall including a cooling hole having:
an inlet defined by an internal surface,
an outlet defined by an external surface,
a metering location having a cross-section area that is smaller than any other cross-section area of the cooling hole, wherein a cross-sectional area of the cooling hole converges to the metering location from the inlet and diverges from the metering location towards the outlet,
an internal diffuser positioned between an inlet and the metering location,
an accumulation diverter portion of the internal diffuser including a diverter wall that is perpendicular to an internal surface of the component wall, and
an accumulator portion of the internal diffuser.

2. The gas turbine engine component of claim 1, further comprising an external diffuser positioned between the metering location and the outlet, the external diffuser configured to diffuse coolant towards the outlet.

3. The gas turbine engine component of claim 2, wherein a first volume of the internal diffuser is at least as large as a second volume of the external diffuser.

4. The gas turbine engine component of claim 2, wherein a first volume of the internal diffuser is between a second volume of the external diffuser and two and a half times the second volume of the external diffuser.

5. The gas turbine engine component of claim 2, wherein an in wall diffusion angle that is less than 180 degrees is formed between a first upper wall of the internal diffuser and a second upper wall of the external diffuser.

6. The gas turbine engine component of claim 5, wherein the in wall diffusion angle is between 150 degrees and 170 degrees.

7. The gas turbine engine component of claim 1, wherein the accumulation diverter portion is positioned adjacent to the inlet within the internal diffuser portion on a side opposite the direction of a flow of coolant.

8. The gas turbine engine component of claim 1, wherein the accumulation diverter portion is configured to create a pocket of a coolant within the accumulation diverter portion.

9. The gas turbine engine component of claim 8, wherein the pocket of the coolant conditions a flow of the coolant such that the flow of the coolant is directed towards the metering location.

10. The gas turbine engine component of claim 1, wherein the diverter wall has a length that is at least a third of a diameter of the cooling hole at the metering location.

11. The gas turbine engine component of claim 1, wherein the accumulator portion includes a curved surface adjacent an internal surface of the component wall.

12. The gas turbine engine component of claim 11, wherein the curved surface is aerodynamically configured to turn a flow of a coolant in a direction towards the outlet.

13. The gas turbine engine component of claim 1, wherein the internal diffuser is configured to diffuse coolant towards the metering location.

14. The gas turbine engine component of claim 1, wherein the accumulator diverter portion is positioned within the cooling hole and is defined by the component wall.

15. The gas turbine engine component of claim 1, wherein the accumulator diverter portion is configured increase a driving pressure of a coolant through the cooling hole by conditioning a flow of the coolant adjacent to the inlet.

16. A gas turbine engine comprising:
a compressor section;
a combustor section; and
a turbine section, wherein at least one of the compressor section or the turbine section include a component that includes a component wall having an internal surface adjacent a flow of coolant and an external surface adjacent a flow of gas, the component wall including a cooling hole having:
an inlet defined by the internal surface,
an outlet defined by the external surface,
a metering location having a cross-section area that is smaller than any other cross-section area of the cooling hole, wherein a cross-sectional area of the cooling hole converges to the metering location from the inlet and diverges from the metering location towards the outlet,
an internal diffuser positioned between the inlet and the metering location diffuser including a diverter wall perpendicular to an internal surface of the component wall,
an accumulation diverter portion of the internal diffuser, and
an accumulator portion of the internal diffuser.

17. The gas turbine engine of claim 16, wherein the component is positioned within the turbine section.

18. The gas turbine engine of claim 16, wherein the component is an airfoil.

19. A gas turbine engine component wall comprising:
an external surface;
an internal surface; and
a cooling hole having:
a metering location, wherein a cross-sectional area of the cooling hole converges to the metering location from an inlet and diverges from the metering location towards an outlet,
a lower wall extending from the internal surface to the external surface, the lower wall having a first lower wall portion that extends from the metering location to the external surface and a second lower wall portion that extends from the internal surface to the metering location, the second lower wall portion including a curve adjacent the internal surface and curving towards the metering location,
a diverter wall having a first side adjacent the internal surface and a second side, the diverter wall perpendicular with the internal surface, and
an upper wall extending from the internal surface to the external surface, the upper wall having a first upper wall portion that extends from the metering location to the external surface and a second upper wall portion that extends from the second side of the diverter wall to the metering location such that an in wall diffusion angle exists between the first upper wall portion and the second upper wall portion that is between 150 degrees and 170 degrees.

\* \* \* \* \*